United States Patent
Neel et al.

(10) Patent No.: US 11,671,440 B1
(45) Date of Patent: Jun. 6, 2023

(54) DETECTION FAILURE MONITORING SYSTEM

(71) Applicant: United Services Automobile Association (USAA), San Antonio, TX (US)

(72) Inventors: Robert Jason Neel, Boerne, TX (US); Neelsen Cyrus, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 241 days.

(21) Appl. No.: 17/003,458

(22) Filed: Aug. 26, 2020

Related U.S. Application Data

(63) Continuation of application No. 15/827,906, filed on Nov. 30, 2017, now Pat. No. 10,764,318.

(51) Int. Cl.
*H04L 9/40* (2022.01)
*H04L 43/50* (2022.01)
*H04L 41/147* (2022.01)
*H04L 43/06* (2022.01)

(52) U.S. Cl.
CPC ........ *H04L 63/1433* (2013.01); *H04L 41/147* (2013.01); *H04L 43/06* (2013.01); *H04L 43/50* (2013.01)

(58) Field of Classification Search
CPC ............. H04L 63/1433; H04L 63/1425; H04L 63/1416
See application file for complete search history.

(56) References Cited

U.S. PATENT DOCUMENTS

| | | | |
|---|---|---|---|
| 9,990,499 | B2 | 6/2018 | Chan et al. |
| 2016/0127417 | A1 | 5/2016 | Janssen |
| 2016/0246961 | A1 | 8/2016 | Wang |
| 2018/0288084 | A1 | 10/2018 | Shang et al. |

*Primary Examiner* — Paul E Callahan
(74) *Attorney, Agent, or Firm* — Fletcher Yoder, PC

(57) ABSTRACT

The present disclosure relates generally to improved systems and methods for ensuring continued network security in a data network. More specifically, present embodiments are directed to detecting and responding to the failure of a security detection module employed for network security in the data network. A detection failure monitoring system may detect that a security detection module has failed by executing a number of test cases simulating conditions that should be flagged by the security detection module. To that end, when the detection failure monitoring system determines that a security detection module did not flag a condition produced by an executed test case, the detection failure monitoring system may implement a response to address the failed security detection module. Accordingly, the systems and techniques provided herein may maintain network security with improved granularity and robustness.

20 Claims, 2 Drawing Sheets

DETECTION FAILURE MONITORING SYSTEM

CROSS-REFERENCE TO RELATED APPLICATIONS

This application is a continuation of U.S. application Ser. No. 15/827,906, entitled "DETECTION FAILURE MONITORING SYSTEM," filed Nov. 30, 2017, which is hereby incorporated by reference in its entirety for all purposes.

BACKGROUND

The present disclosure relates generally to systems and methods for detecting and responding to issues in network security of a data network. More specifically, the present disclosure relates to systems and methods for ensuring the functionality of a security detection module via a security monitoring system.

A data network (e.g., real-time communication network), such as a computer network, may incorporate network security to protect and prevent against misuse of resources accessible in the data network. As such, the data network may employ a set of policies and practices to ensure operations and data in the data network remain consistently reliable. These policies and practices may include a number of security detection modules that monitor data and operations in the data network and flag (e.g., detect) and/or prevent any suspicious or threatening activity, such as unauthorized access, vulnerabilities, and the presence of malware, among other things, that may lead to or cause the misuse of the resources available in the data network. However, when a security detection module fails, the data network is vulnerable to threatening activity that the security detection module would flag under normal operation.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a network security system implemented in a data network includes one or more databases that store information associated with a security detection module. The network security system further include one or more processors configured to generate a test case based on the information associated with the security detection module, where the security detection module is configured to flag a condition associated with execution of the test case. The one or more processors are further configured to execute the test case and configured to determine whether the security detection module has flagged the condition associated with the execution of the test case. In response to determining that the security detection module has failed to flag the condition associated with the execution of the test case, the one or more processors are configured to output a notification to a computing device that the security detection module has failed to flag the condition associated with the test case.

In one embodiment, a method for testing network security in a data network, where the network security comprises a security detection module, includes retrieving, using one or more processors, a test case profile associated with a test case from one or more databases. Further, the method includes executing, using the one or more processors, the test case based on the test case profile, where the security detection module is configured to flag a condition associated with execution of the test case. The method further includes determining, using the one or more processors, a failure of the security detection module to flag the condition associated with the execution of the test case. In response to the failure, the method includes retrieving, using the one or more processors, a response profile associated with a response from the one or more databases, where the response is configured to correct a cause of the failure, and the method includes implementing, using the one or more processors, the response.

In one embodiment, a tangible, non-transitory, computer-readable medium, comprises computer-readable instructions that, when executed by one or more network security processors of a data network, cause the one or more network security processors to generate a test case based on a security detection module profile associated with a security detection module and stored in one or more databases, where the security detection module is configured to flag a condition associated with execution of the test case, and to execute the test case based on a test case profile associated with the test case and stored in the one or more databases. Further, the computer-readable instructions, when executed, cause the one or more network security databases to determine whether the security detection module has flagged the condition associated with the execution of the test case. In response to determining that the security detection module has failed to flag the condition associated with the execution of the test case, the one or more network security processors retrieve a response profile associated with a response from the one or more databases based on the security detection module profile, the test case profile, or a combination thereof and implement the response based on the response profile, where the response is configured to correct a cause of the security detection module failing to flag the condition associated with the execution of the test case.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
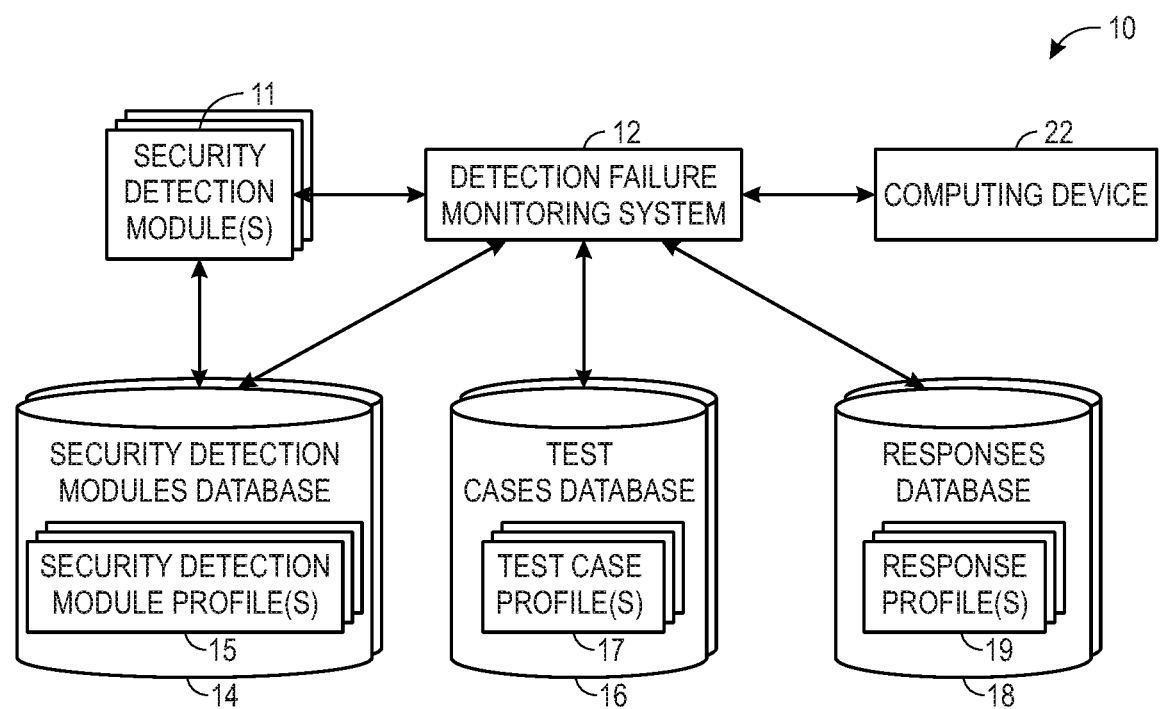
FIG. 1 illustrates a block diagram of a security monitoring system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to improved systems and methods for ensuring continued network security in a data network. More specifically, present embodiments are directed to detecting and responding to the failure of a security detection module employed for network security in the data network. In some embodiments, a detection failure monitoring system may interface with one or more databases that store information related to a number of security detection modules (e.g., security functions). The detection failure monitoring system may further interface with one or more databases that store information related to a number of test cases (e.g., that simulate malicious data, traffic, and/or execute programs) that the detection failure monitoring system may generate based on the security detection modules. That is, the test cases may each correspond to a respective security detection module and be constructed to cause the respective security detection module to flag a condition generated by the execution of a respective test case. As such, to test the functionality of the security detection modules in the data network, or to detect a security detection module that has failed, the detection failure monitoring system may execute the test cases to simulate the conditions (e.g., malicious data) that should be flagged by the security detection module. To that end, if the detection failure monitoring system determines that a security detection module did not flag a condition produced by an executed test case, the detection failure monitoring system may determine that the security detection module failed. Accordingly, the detection failure monitoring system may interface with one or more databases that store information related to suitable responses to address failures of the security detection module. Thus, upon detection of a failed security detection module, the detection failure monitoring system may determine and perform a responsive action, such as determining a cause of the failure, resetting data hardware (e.g., one or more servers) in the data network, restoring the security detection module to a previous version of the security detection module, sending an alert, or a suitable combination thereof. As such, the detection failure monitoring system may maintain network security with improved efficacy and granularity. That is, by detecting and automatically addressing the failure of a security detection module, the detection failure monitoring system may improve reliability of the network security. Further, by detecting issues with the network security at a lower level, the detection failure monitoring system may provide increased granularity. Additional details regarding the detection failure monitoring system and various processes performed by the detection failure monitoring system will be described below with reference to FIGS. 1-3.

By way of introduction, FIG. 1 illustrates a block diagram of a security monitoring system 10 (e.g., framework) that may monitor a number of security detection modules 11 involved in network security for a data network in accordance with embodiments described herein. The security monitoring system 10 may detect and address (e.g., respond to or correct) a failed security detection module (e.g., 11) to ensure its continued functionality. As such, the security monitoring system 10 may include a detection failure monitoring system 12, a security detection modules database 14, a test cases database 16, a responses database 18, and a computing device 22. The detection failure monitoring system 12, in certain embodiments, may be a cloud-based computing system that includes a number of computers that may be connected through a real-time communication network, such as the Internet. In one embodiment, large-scale analysis operations may be distributed over the computers that make up the cloud-based computing system. Although the detection failure monitoring system 12 is described above as a cloud-based computing system, the detection failure monitoring system 12 may be any suitable computing system or device that is capable of communicating with other devices and processing data, in accordance with the techniques described herein.

In one embodiment, the detection failure monitoring system 12 may communicatively couple to the security detection modules database 14. The security detection modules database 14 may store data (e.g., information) related to a number of different security detection modules 11 (e.g., security functions) included in the detection failure monitoring system 12. A security detection module 11 may be used to detect and/or block errors and/or threats (e.g., risks) in a data network. The security detection modules database 14 may store a security detection module profile 15 for each security detection module 11 that may include information, such as an identifier, for a respective security detection module 11. For example, in an embodiment, the identifier of the security detection module 11 may include a name or an identification number or code associated with the respective security detection module 11. Further, the security detection module profile 15 may include data regarding a description, an expected behavior, a history (e.g., revision history), and the like of the respective security detection module 11. The description of the security detection module 11 may include a brief summary of how the security detection module 11 was implemented. That is, the description may include details relating to the mechanics or workings behind the security detection module 11. The expected behavior of the security detection module 11 may include a list of conditions that the security detection module 11 may detect and a suitable response mapped to each or a combination of the conditions in the list. In some embodiments, the fulfillment of any one of the conditions in the list may trip (e.g., trigger) a security detection module 11, but the response of the tripped security detection module 11 may vary depending on which of the conditions or combination thereof was responsible for tripping the security detection module 11. The history of the security detection module 11 may include a description of a set of revisions (e.g., updates) made to the security detection module 11, an owner (e.g., network administrator) of each of the revisions, a set of dates marking when the revisions were made, and/or previous versions of the security detection module 11. That is, in some embodiments, the history of the security detection module 11 may include a set of links to the previous versions of the security detection module 11, which may be stored within the security detection modules database 14 or a separate database so that they may be loaded at any suitable time to restore a current version of the security detection module 11 to an older version of the security detection module 11.

As an illustrative example, a security detection module 11 may include a function to detect access to an operating system's services. In some embodiments, the function may detect an instance of a computing shell running in a data network that accesses the operating system's services, such as POWERSHELL As such, the security detection modules database 14 may include a security detection module profile 15 having information related to this function. For example, the security detection module profile 15 may identify the function as "POWERSHELL Detector" and include a description of the function. The description may include an application and/or language (e.g., C, C#, C++) that the function is implemented in, as well as associated variables, such as inputs and outputs to the function, libraries, and/or other functions that depend on the function, or vice versa. That is, the description may include information relevant to understanding the structure of the function that a developer (e.g., network administrator) of the function may provide to other developers or users to implement and/or update the function. Further, the security detection profile 15 may contain a list of conditions, such as an unauthorized user running an instance of POWERSHELL in the data network that may trigger the security detection module 11. As such, the list of conditions maintained by the security detection profile 15 may include information regarding a monitored application, such as a name (e.g., "POWERSHELL"), a method of identifying the use or execution of the application (e.g., a file running with a ".ps1" extension), and/or a list of users unauthorized to use the application. When the conditions that trigger the security detection module 11 are met (e.g., a user that is on the list of unauthorized users is running a file with a ".ps1" extension), the security detection module 11 may perform a suitable response or action, such as interrupting the use of POWERSHELL run by the unauthorized user or alerting a network administrator. As such, the security detection modules 14 database may store information related to the suitable response mapped to (e.g., associated with) the condition that triggers the security detection module 11. Further, as the security detection module 11 is updated to monitor, for example, the use of POWERSHELL by a group of users excluded in the original list of unauthorized users, the security detection modules database 14 may update the history of the security detection module 11. That is, the security detection modules database 14 may track the changes made to the function to include the users excluded in the original list unauthorized users and may maintain an original, as well as an updated (e.g., current) version of the function.

The detection failure monitoring system 12 may additionally or alternatively communicate with the test cases database 16. In some embodiments, the test cases database 16 may store data related to a test case that may check the functionality of a corresponding security detection module 11. As such, the test case may implement a condition that may trigger a security detection module 11, according to the expected behavior of the security detection module 11, and may monitor the actual behavior of the security detection module 11 in response to the fulfillment of the condition. Accordingly, the test cases database 16 may store a test case profile 17 for each test case having information regarding the identity of the test case, such as a name and/or identification number or code, a reference to a security detection module 11 associated with the test case, a description of the test case, and a set of guidelines for the test case. The test case may check the functionality of the security detection module 11 associated with the test case. As such, in some embodiments, the description of the test case may include instructions for executing (e.g., running) the test case for the security detection module 11, which may include machine-readable instructions. The description of the test case may further include the conditions implemented by the test case that may trigger the security detection module 11. Further, the set of guidelines for the test case may include a threshold (e.g., duration) after which the security detection module 11 is determined to have failed to detect the conditions implemented by the test case. The guidelines may further include a number of occurrences the security detection module 11 may allowably fail to detect the test case before a response is implemented in regards to the security detection module 11. That is, the guidelines may include a threshold number of occurrences the security detection module 11 may fail to flag the condition associated with the test case before the detection failure monitoring system 12 implements a suitable response.

Continuing with the previous example, the test cases database 16 may include a test case profile 17 having information regarding a test case associated with the security detection module "POWERSHELL Detector." As such, the test cases database 16 may identify the test case as "POWERSHELL Detector—Unauthorized User" and may include a condition that an unauthorized user runs POWERSHELL in a description of the test case. Further, the description of the test case may include machine-readable code that may cause the detection failure monitoring system 12 to implement the condition on the data network. That is, the description of the test case may be used to simulate an unauthorized user running an instance of POWERSHELL on the data network. While the detection failure monitoring system 12 may simulate the condition that should be flagged by a security detection module 11, a failure to flag the condition may not negatively affect the data network and/or network security. That is, the condition may be simulated in a manner that should trigger a security detection module 11 but not break or misuse the data network and/or network security. As will be discussed in further detail, to gauge the success of a security detection module 11 with the test case, the test case profile 17 may include a set of guidelines related to the test case. For example, the test case guidelines may dictate that the security detection module 11 failed to detect the condition after a threshold duration (e.g., 5 seconds) has passed and the expected behavior of the security detection module 11 was not detected. Further, the guidelines may provide a number of occurrences (e.g., 1-10 occurrences, or the like) that the security detection module 11 may fail to detect the condition before the detection failure monitoring system 12 implements a response to address the security detection module 11.

Although the foregoing description of the security detection module 11 and the test case is related to the detection of POWERSHELL run by unauthorized users, it should be noted that any other suitable security detection module 11 may also be maintained by the security detection modules database 14 and checked by a suitable test case maintained in the test cases database 16. In some embodiments, for example, a security detection module 11 may be constructed to flag a target Internet Protocol (IP) address, a file with certain contents (e.g., malware), a registry key, and/or invalid user authentication, among other things, and a set of test cases corresponding to these security detection modules 11 may be constructed to detect a failure of any of the security detection modules 11. That is, the embodiments described herein should not be limited to the examples expressly recited.

With this in mind, the security monitoring system 10 may include the responses database 18 that may store data associated with suitable responses or actions that the detection failure monitoring system 12 may take to address a security detection module 11 that has failed. That is, the responses database 18 may contain information related to a set of operations, or tasks, that the detection failure monitoring system 12 may complete to act upon a security detection module 11 failure. For example, with respect to the example of the "POWERSHELL Detector" security detection module failing to detect the unauthorized users simulated by the "POWERSHELL Detector—Unauthorized Users" test case, a respective response may include any combination of reverting the security detection module 11 to an older version (e.g., an immediately previous version, the original version, or the like), sending an alert to the computing device 22, or the like. As such, in some embodiments, the responses database 18 may include a response profile 19 having an identifier (e.g., name), a reference to a security detection module 11 corresponding to the response, a reference to a test case failed by the security detection module 11, and/or a method (e.g., instructions) to complete the response for each response in the responses database 18. Thus, in the context of the previous example, a response profile 19 may include an identifier of "POWERSHELL Detector—Revert Version" corresponding to the response of reverting the security detection module 11 to an older version, a reference to the "POWERSHELL Detector" security detection module, a reference to the "POWERSHELL Detector—Unauthorized User" test case failed by the "POWERSHELL Detector" security detection module, and/or instructions (e.g., machine-readable instructions) for the detection failure monitoring system 12 to perform the response of reverting the security detection module 11 to an older version.

While the embodiments herein describe separate databases for the security detection modules database 14, the test cases database 16, and the responses database 18, it should be understood by one skilled in the art that embodiments may include any suitable number of databases to store the relevant information related to the security detection modules, the test cases, and/or the responses. As such, fewer or additional databases may be used in the security monitoring system 10.

To test, detect, and respond to a failed security detection module 11, the detection failure monitoring system 12 may generate and/or receive suitable data regarding security detection modules, test cases, and/or responses addressing failed security detection modules 11. That is, the detection failure monitoring system 12 may automatically populate and update the information maintained in the security detection modules database 14, the test cases database 16, and/or the responses database 18 based on the security detection modules 11 included in the detection failure monitoring system 12. As such, in some embodiments, the detection failure monitoring system 12 may receive an input from the computing device 22 indicating that a new security detection module 11 has been created or that an existing security detection module 11 has been updated. The input may further provide information related to the new or updated security detection module 11. That is, in some embodiments, a computing device 22 may be used to create or update a security detection module 11 and may provide an input to the detection failure monitoring system 12 indicating these changes. Additionally or alternatively, in some embodiments, the detection failure monitoring system 12, itself, may be used to create or update a security detection module 11. In any case, upon the creation or modification of a security detection module 11, the detection failure monitoring system 12 may update the security detection modules database 14 (e.g., a security detection module profile 15 associated with the security detection module 11) to reflect any new information related to the security detection module 11. Further, based on the information related to the security detection module 11 in the security detection modules database 14, the detection failure monitoring system 12 may determine that a new test case and/or response may suitably detect or address a failure of the security detection module 11, respectively. As such, the detection failure monitoring system 12 may generate a test case and populate the test cases database 16 (e.g., a test case profile 17 associated with the test case) with information related to the test case according to the information related to the security detection module 11 in the security detection modules database 14. Further, the detection failure monitoring system 12 may generate a suitable response and populate the responses database 18 (e.g., a response profile 19 associated with the response) with information related to the response according to the information related to the security detection module 11 from the security detection modules database 14 and the test case from the test cases database 16.

Additionally or alternatively, the detection failure monitoring system 12 may receive an input from the computing device 22 to update the test cases database 16 and/or the responses database 18. That is, the input from the computing device 22 may provide information to supplement and/or override information in the test cases database 16 and the responses database 18 to add, update, or remove test case profiles 17 and/or response profiles 19. As such, a network administrator (e.g., user) in the data network may use the computing device 22 to create and send an input to update the test cases database 16 and/or the responses database 18.

The computing device 22 may include any suitable processor-based computing system, such as a desktop computer, a laptop computer, a mobile computing device (e.g., smart phone), a tablet computing device, and the like. In any case, the computing device 22 may transmit an input to the detection failure monitoring system 12. Further, in some embodiments, the computing device 22 may receive a notification (e.g., alert) from the detection failure monitoring system 12 associated with a response to address a failed security detection module 11. In such embodiments, the computing device 22 may provide an indication that the notification was received. The indication may be a ring tone, a vibration pattern, a visualization, a reminder, a task, or the like. In some embodiments, the notification may activate an application or program stored on the computing device 22, despite the computing device 22 being in a sleep or low power mode to increase the likelihood that a user will take note of the notification.

Although the detection failure monitoring system 12 is described as sending notifications to the computing device 22, in some embodiments, the detection failure monitoring system 12 may be a computing device associated with the network administrator. As such, the detection failure monitoring system 12 may be accessible to the network administrator and may generate visualizations and alerts to notify the network administrator regarding suitable responses that may address a security detection module 11 failure.

Further, with suitable information related to a security detection module 11 in the security detection modules database 14, a test case in the test cases database 16, and a response in the responses database 18, the detection failure monitoring system 12 may effectively detect and address a failed security detection module 11. Further, by detecting and addressing the failed security detection module 11, the detection failure monitoring system 12 may provide increased granularity and robustness of the network security of a data network. That is, the detection failure monitoring system 12 may increase the granularity of the network security by detecting the failure of security detection modules 11 and at what point the failure occurred. Further, by addressing a failed security module 11, the detection failure monitoring system 12 may maintain more robust network security, as the network security may remain functional more consistently.

Figure 2:
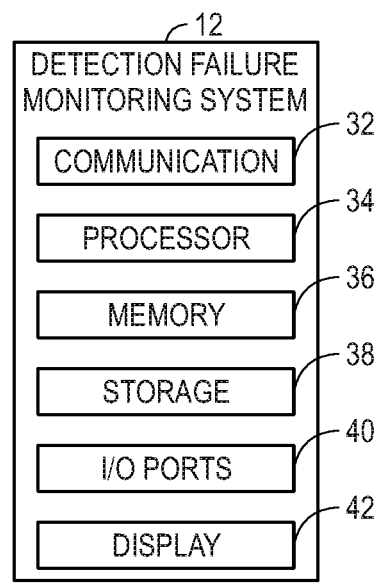
FIG. 2 illustrates a block diagram of the detection failure monitoring system that may be part of the security monitoring system of FIG. 1, in accordance with embodiments described herein.

To perform some of the actions set forth above, the detection failure monitoring system 12 may include certain components to facilitate these actions. FIG. 2 is a block diagram of example components within the detection failure monitoring system 12, in accordance with the embodiments described herein. For example, the detection failure monitoring system 12 may include a communication component 32, a processor 34, a memory 36, a storage 38, input/output (I/O) ports 40, a display 42, and the like. The communication component 32 may be a wireless or wired communication component 32 that may facilitate communication between, for example, the security detection modules database 14, the test cases database 16, the responses database 18, the computing device 22, and the like. The processor 34 may be any type of suitable computer processor or microprocessor capable of executing computer-executable code. The processor 34 may also include multiple processors that may perform the operations described below.

The memory 36 and the storage 38 may be any suitable articles of manufacture that may serve as media to store processor-executable code, data, or the like. These articles of manufacture may represent non-transitory, computer-readable media (e.g., any suitable form of memory or storage) that may store the processor-executable code used by the processor 34 to perform the presently disclosed techniques. The memory 36 and the storage 38 may also be used to store data, various other software applications, and the like. For example, the memory 36 and the storage 38 may not only store the processor-executable code used by the processor 34 to perform various techniques described herein but code for other techniques as well. It should be noted that the term "non-transitory" merely indicates that the media is tangible and not a signal.

The input/output (I/O) ports 40 may be interfaces that may couple to other peripheral components such as input devices (e.g., keyboard, mouse), sensors, input/output (I/O) modules, and the like. The display 42 may operate to depict visualizations associated with software or executable code being processed by the processor 34. In one embodiment, the display 42 may be a touch display capable of receiving inputs from a user of the detection failure monitoring system 12. The display 42 may be any suitable type of display 42, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the detection failure monitoring system 12.

It should be noted that the components described above with regard to the detection failure monitoring system 12 are exemplary components and the detection failure monitoring system 12 may include additional or fewer components as shown. Additionally, it should be noted that the computing device 22 may also include similar components as described as part of the detection failure monitoring system 12.

Figure 3:
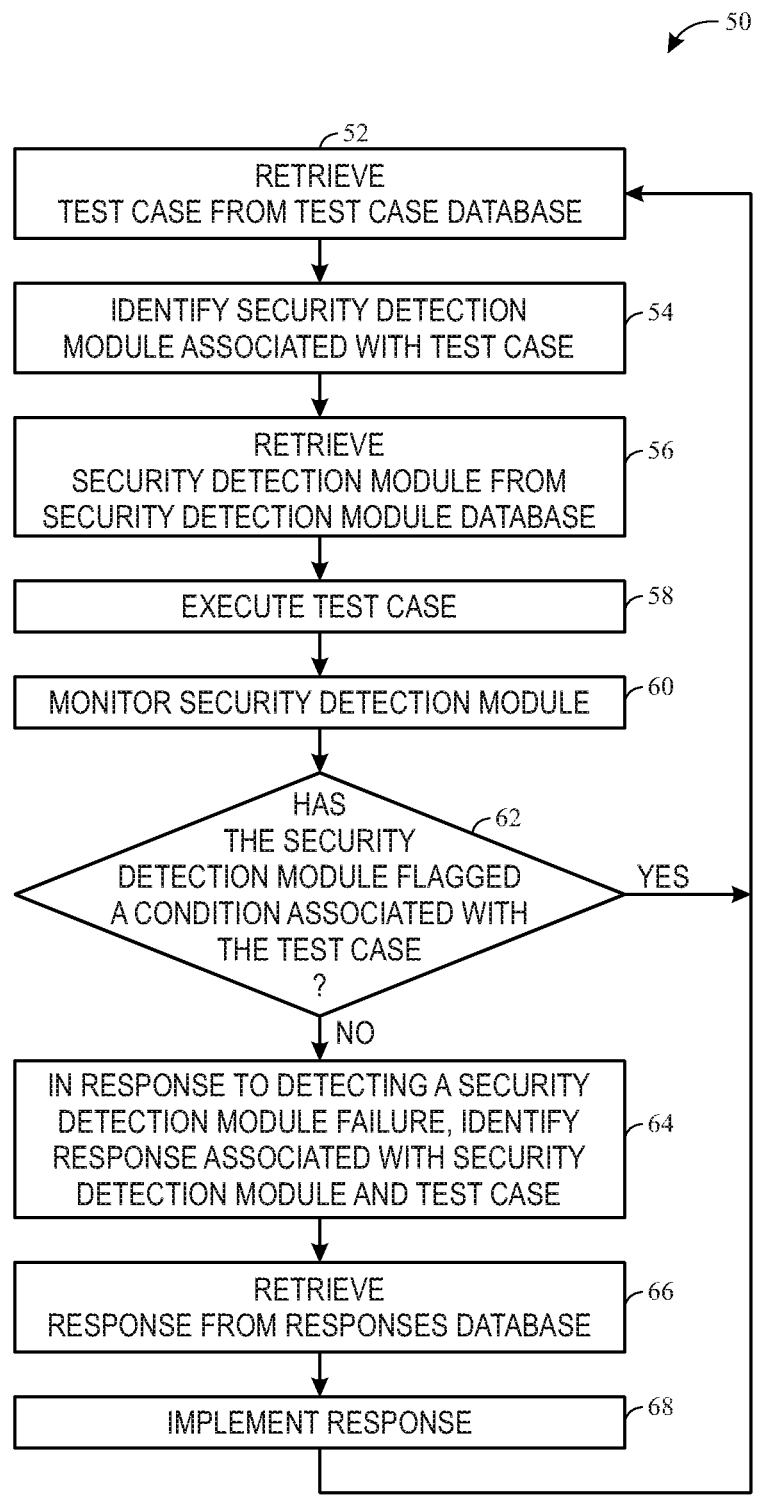
FIG. 3 illustrates a flow chart of a method for detecting and responding to a failed security detection module in the security monitoring system of FIG. 1, in accordance with embodiments described herein.

With the foregoing in mind, FIG. 3 illustrates a flow chart of a method 50 for detecting a failed security detection module 11, in accordance with embodiments described herein. Although the following description of the method 50 is described in a particular order, which represents a particular embodiment, it should be noted that the method 50 may be performed in any suitable order. Further, certain steps may be skipped altogether, and additional steps may be included in the method 50. Moreover, although the following description of the method 50 is described as being performed by the detection failure monitoring system 12, it should be noted that the method 50 may be performed by any suitable computing device. More specifically, in some embodiments, the method 50 may be implemented by a processor (e.g., processor 34), which is understood to include one or more processors.

The method 50 may be triggered (e.g., initiated) by any of a number of suitable events. In one embodiment, for example, the detection failure monitoring system 12 may receive an input that may trigger the method 50. The input may involve, for example, an update to a security detection module's information that may impact the security detection modules database 14 (e.g., a security detection module 11 is updated) and/or an update to a test case's information included in the test cases database 16 (e.g., a new test case is added to simulate a new condition for an updated security detection module 11). Further, the input may be received from the computing device 22 or the detection failure monitoring system 12 itself.

In some embodiments, the computing device 22 and/or the detection failure monitoring system 12 may monitor and automatically determine suitable inputs to trigger the method 50. In some embodiments, for example, the computing device 22 and/or the detection failure monitoring system 12 may receive a request initiated by a network administrator to check the functionality of a security detection module 11 in response to a test case. The computing device 22 may send this request to the detection failure monitoring system 12, which may initiate the method 50 to determine if the security detection module 11 has failed the test case or is still functioning as expected for the conditions provided by the test case. In another embodiment, the detection failure monitoring system 12 may regularly perform the method 50 with a certain periodicity (e.g., every 1, 8, 12, 24, 48 hours, every week, every two weeks, or the like).

Referring now to FIG. 3, once the method 50 is initiated by a suitable event, at block 52, the detection failure monitoring system 12 may retrieve information regarding a test case from the test cases database 16. In some embodiments, the suitable event that initiated the method 50 may include identification information so that the detection failure monitoring system 12 may retrieve a specific test case. That is, for example, the detection failure monitoring system 12 may receive an input including an identifier for the test case before retrieving it from the test cases database 16. In some embodiments, the detection failure monitoring system 12 may retrieve a test case profile 17 associated with the test case from the test cases database 16. Further, as discussed, the test case profile 17 retrieved from the test cases database 16 associated with the test case may include identification information, information regarding a security detection module 11 associated with the test case, a description of the test case, and/or a set of guidelines, among other things.

As such, at block 54, the detection failure monitoring system 12 may identify the security detection module 11 associated with the test case based on the information regarding the test case retrieved from the test cases database 16. That is, the detection failure monitoring system 12 may identify the security detection module 11 by determining an identifier associated with the security detection module 11 that is also included in the information regarding the test case.

Thus, at block 56, the detection failure monitoring system 12 may retrieve information related to the security detection module 11 identified at block 54 from the security detection modules database 14. That is, the detection failure monitoring system 12 may retrieve an identifier, a description, an expected behavior, a history, and the like associated with the security detection module 11. In some embodiments, the detection failure monitoring system 12 may retrieve the security detection module profile 15 from the security detection modules database 14.

At block 58, the detection failure monitoring system 12 may execute the test case. That is, according to the information related to the test case in the test cases database 16, the detection failure monitoring system 12 may simulate a condition that may trigger the security detection module 11 associated with the test case. In some embodiments, the information related to the test case may include machine-readable instructions that, when executed by the processor 34, may cause the processor 34 to produce the condition that may trigger the security detection module 11. In such embodiments, the instructions may be constructed to simulate the condition without causing a negative impact to the network security. That is, the condition simulated by the detection failure monitoring system 12 should be flagged by a security detection module 11, but the failure of the security detection module 11 to do so may not result in a harm or threat to the network security based on the simulated condition. However, if the condition is produced somewhere else in the data network (e.g., not based on the test case executed by the detection failure monitoring system 12), a failure to flag the condition may result in a negative impact on the network security. For example, running the "POWERSHELL Detector—Unauthorized User" test case may involve running an empty POWERSHELL script, or file, that should be flagged by the "POWERSHELL Detector" security detection module, but if conditions simulated by the test case are not flagged, the network security may not be impacted, as running the POWERSHELL script may not produce any change to the data network. However, if an actual unauthorized user runs a POWERSHELL script on the data network that is not flagged by the "POWERSHELL Detector" script, the execution of the POWERSHELL script may negatively affect the network security and may produce harmful changes to the data network.

As the processor 34 executes the test case, at block 58, and/or at the completion of the execution of the test case, the detection failure monitoring system 12 may, at block 60, monitor the security detection module 11 associated with the test case. That is, the detection failure monitoring system 12 may monitor an actual behavior of the security detection module 11 in response to the condition provided by the execution of the test case. The actual behavior may include flagging the condition associated with the executed test case or failing to respond to the condition, among other things.

As such, at decision block 62, the detection failure monitoring system 12 may determine whether the security detection module 11 has flagged the condition associated with the execution of the test case. That is, the detection failure monitoring system 12 may determine whether the security detection module 11 has failed or is operating normally based on a comparison between the actual behavior and the expected behavior of the security detection module 11 in response to the condition produced by the test case. The comparison may further include whether the expected behavior and the actual behavior align within a certain threshold (e.g., duration). That is, the actual behavior may occur within a certain amount of time (e.g., 5 seconds) after the test case is executed in order for the security detection module 11 to function as expected. Further, in determining whether the security detection module 11 has failed, the detection failure monitoring system 12 may determine a number of occurrences the actual behavior has not matched the expected behavior for a current version of the security detection module 11. As such, if the actual behavior does not match the expected behavior and has not matched the expected behavior for a number of occurrences greater than a threshold number of occurrences (e.g., that may be included in the information related to the test case), the detection failure monitoring system 12 may determine that the security detection module 11 has failed.

In response to detecting that the security detection module 11 flagged the condition associated with the test case, the detection failure monitoring system 12 may retrieve a new test case and restart the method 50 at block 52. Additionally or in the alternative, the detection failure monitoring system may retrieve the same test case and retest its execution by restarting the method 50 at block 52.

In response to detecting a failure of the security detection module 11 to flag the condition associated with the test case, at block 64, the detection failure monitoring system 12 may identify a response associated with the security detection module 11 and the test case. That is, the detection failure monitoring system 12 may identify the response suitable to address the failure of the security detection module 11. The detection failure monitoring system 12 may identify the response by determining which response profile 19 in the responses database 18 is associated with the security detection module 11 and the test case. The response may include, for example, any combination of restoring the security detection module 11 to an older version, determining a cause of the failure, resetting data network hardware (e.g., server), running additional test cases, or sending an alert, among other things.

Thus, at block 66, the detection failure monitoring system 12 may retrieve information regarding the identified response associated with the security detection module 11 and the test case from the responses database 18. The information related to the response may include an identifier (e.g., name), a security detection module 11 corresponding to the response, a test case failed by the security detection module 11, and a method (e.g., instructions) to complete the response. In some embodiments, the detection failure monitoring system 12 may retrieve a response profile 19 associated with the response from the responses database 18.

Accordingly, at block 68, the detection failure monitoring system 12 may use the information related to the response retrieved at block 66 to implement the response that may suitably address the failure of the security detection module 11. In some embodiments, for example, the method to complete the response may include machine-readable instructions that, when executed by the processor 34, cause the processor 34 to implement the response. As discussed, the response that may suitably address the failure of the security detection module 11 may include any suitable combination of determining a cause of the failure, executing an additional test case, reverting the security detection module 11 to an older version (e.g., functional version), resetting equipment, sending an alert to the computing device 22, or the like.

In some embodiments, a response that may suitably address the failure of the security detection module 11 may involve determining a cause of a failed security detection module 11. That is, the detection failure monitoring system 12 may determine why the security detection module 11 did not exhibit expected behavior for a condition. To do so, the detection failure monitoring system 12 may identify, based on information included in the security detection modules database 14 and/or the test cases database 16, additional test cases and/or other security detection modules 11 that the security detection module 11 depends on. The detection failure monitoring system 12 may then execute the additional test cases and/or test cases associated with the other security detection modules 11 to search for additional security detection module 11 failures. That is, the detection failure monitoring system 12 may repeat steps involved in the method 50 for the additional test cases and/or the test cases associated with the other security detection modules 11. In fact, the detection failure monitoring system 12 may continuously and/or recursively identify and hierarchically traverse other security detection modules 11 that the failed security detection module 11 depends on. The detection failure monitoring system 12 may then execute their associated test cases until a certain event, such as executing a certain number of test cases, traversing a certain number of levels of security detection module 11 relationships, or locating a security detection module 11 with the closest hierarchical relationship to the failed security detection module 11 that does not fail any of its associated test cases, occurs. Based on the certain event or combination thereof that ends the detection failure monitoring system's 12 execution of test cases occurs, the detection failure monitoring system 12 may determine the cause of the failed security detection module 11 and/or at what point the security detection module 11 failed.

For example, if all of the test cases associated with the security detection modules 11 directly related to the failed security module 11 are executed successfully (e.g., the security detection modules 11 exhibit expected behaviors), the detection failure monitoring system 12 may determine that the cause of the failed security detection module 11 may be isolated to the failed security detection module 11, itself. As such, updates to and/or reverting to an older version of the failed security detection module 11 may suitably correct any issues with the failed security detection module 11. On the other hand, if one of the other security detection modules 11 fails a test case, the detection failure monitoring system 12 may determine that the cause of the failed security detection module 11 is located somewhere higher in the hierarchy of associated security detection modules 11 and may respond to correct the cause at this level to address the failed security detection module 11.

Reverting the security detection module 11 to an older version may include rolling back revisions included in a current version of the security detection module 11. As such, the detection failure monitoring system 12 may determine the changes made to the current version of the security detection module 11 since the older version was created by comparing dates of the changes made to the security detection module 11 to a date the older version of the security detection module 11 was created. The changes and corresponding dates may be maintained in a revision history of the security detection module, which may be included in a security detection module profile 15 associated with the security detection module 11 in the security detection modules database 14. The detection failure monitoring system 12 may then revert (e.g., undo) each of the changes made to the security detection module 11 after the older version of the security detection module 11 was created. Further, the detection failure monitoring system 12 may update the security detection module profile 15 associated with the security detection module 11 in the security detection modules database 14 to reflect that the security detection module 11 was rolled back to an older version of the security detection module 11. Additionally or alternatively, the detection failure monitoring system 12 may remove the current version of the security detection module 11 and may replace it entirely with an older version of the security detection module 11. To do so, the detection failure monitoring system 12 may load the older version, in its entirety, directly or indirectly based on information related to the security detection module 11 stored in the security detection modules database 14 (e.g., in the security detection module profile 15). In any case, the detection failure monitoring system 12 may determine a suitable older version of the security detection module 11 to revert to based on the information related to the security detection module 11. In some embodiments, for example, the security detection modules database 14 may include information indicating the most recent properly functioning version of a security detection module (e.g., that functions according to an expected behavior).

Further, the detection failure monitoring system 12 may determine that a security detection module 11 associated with the failed security detection module 11 is properly functional (e.g., exhibiting expected behavior to conditions), but that the security detection module 11 has detected an issue and/or threat. That is, the detection failure monitoring system 12 may determine that a functional security detection module 11 flagged an issue in the network. In some embodiments, the issue may break, or disrupt, other functions on the network, which may impact the functionality of the failed security detection module 11. Additionally or alternatively, the detection failure monitoring system 12 may detect a malfunction in the data network, such as a loss of connectivity or a malfunctioning server, outside those flagged by the functional security detection module 11 that may impact the functionality of the failed security detection module 11. In any case, the detection failure monitoring system 12 may reset network hardware (e.g., server) involved with a detected issue and/or malfunction to address the failed security detection module 11. As such, the detection failure monitoring system 12 may force stop a process impeding the functionality of the network hardware or clear bad or cached data from the network hardware, among other things. Further, in some embodiments, the detection failure monitoring system 12 may interface and communicate directly with the network hardware to detect a malfunction and to send a reset command capable of restarting the network hardware. In other embodiments, the detection failure monitoring system 12 may interface indirectly with the network hardware (e.g., via the computing device 22) to detect a malfunction and to send a reset command.

Further, in some embodiments, the detection failure monitoring system 12 may create notifications (e.g., alerts) based on the failed security detection module 11, the cause of the failure, possible solutions (e.g., responses) to address the failure, or a combination thereof. In such embodiments, for example, the detection failure monitoring system 12 may generate a notification that identifies the failed security detection module, provide a description of the failed security detection module, list the conditions of the executed test case that were failed by the security detection module, and/or provide a list of responses to address the failure and/or that have been taken to address the failure, among other things. The detection failure monitoring system 12 may then output the notification to the computing device 22. After sending the notification, the detection failure monitoring system 12 may provide an indication to a network administrator (e.g., computing device 22 user) that the notification was received at the computing device 22. The indication may be a ring tone, a vibration pattern, a visualization, or the like.

In an embodiment, a notification may cause the computing device 22 to open, run, or execute an application. For example, in an embodiment, the notification may cause the computing device 22 to display a visualization of the notification in the form of a text-based window or application that may display content included in the notification to the user. In an embodiment, the user may already have an application related to the notification open on the computing device 22. In such cases, the notification may appear within the application (e.g., as a pop-up display, as a header, or the like) to display a visualization of the notification to the user. Further, the detection failure monitoring system 12 may send the notification via e-mail, text message, application notifications, and/or any other suitable messaging services platform.

In certain embodiments, the computing device 22 may send a network administrator's (e.g., user's) response to the notification. That is, the computing device 22 may monitor and communicate the network administrator's interaction with the notification. As such, the computing device 22 may instruct the detection failure monitoring system 12 to respond or respond in addition to how the detection failure monitoring system 12 has already responded to address the failed security detection module 11 based on an input from the network administrator. That is, the notification may provide input fields such that, for example, the network administrator may approve or decline recommended responses to address the failed security detection system.

In some embodiments, after implementing the response at block 68, the detection failure monitoring system 12, may retrieve a new test case and restart the method 50 at block 52. Additionally or in the alternative, the detection failure monitoring system may retrieve the same test case and retest its execution by restarting the method 50 at block 52.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A network security system implemented in a data network, comprising:
    one or more databases comprising first information associated with a current version of a security detection module and second information associated with a previous version of the security detection module;
    one or more processors; and
    one or more memory devices configured to store machine-executable instructions that,
        when executed by the one or more processors, cause the one or more processors to:
            execute a first test case based on the first information associated with the current version of the security detection module;
            determine that the current version of the security detection module has failed to indicate a first condition associated with the first test case; and
            in response to determining that the current version of the security detection module has failed to indicate the first condition:
                execute a second test case based on the second information associated with the previous version of the security detection module;
                determine that the previous version of the security detection module has indicated a second condition associated with the second test case; and
                in response to determining that the previous version of the security detection module has indicated the second condition, modify the current version of the security detection module.

2. The network security system of claim 1, wherein the current version of the security detection module is configured to monitor for the first condition, wherein the first condition comprises simulated malicious data, an amount of traffic, one or more executing programs, an unauthorized user accessing the data network, a target Internet Protocol (IP) address accessing the data network, a registry key associated with malware, or any combination thereof.

3. The network security system of claim 1, wherein the machine-executable instructions, when executed by the one or more processors, cause the one or more processors to, determine that the current version of the security detection module has failed to indicate the first condition associated the first test case in response to determining that an actual behavior of the current version of the security detection module does not correlate to an expected behavior of the current version of the security detection module, wherein the first information associated with the current version of the security detection module comprises the expected behavior.

4. The network security system of claim 3, wherein the expected behavior comprises a threshold duration for the current version of the security detection module to indicate the first condition, a number of occurrences for the current version of the security detection module to indicate the first condition before the one or more processors determine that the current version of the security detection module failed to flag the first condition, or both.

5. The network security system of claim 1, wherein the machine-executable instructions, when executed by the one or more processors, cause the one or more processors to, in response to determining that the current version of the security detection module has failed to indicate the first condition, instruct hardware in the data network to reset.

6. The network security system of claim 1, wherein the machine-executable instructions, when executed by the one or more processors, cause the one or more processors to, in response to determining that the previous version of the security detection module has indicated the second condition, modify the previous version of the security detection module.

7. The network security system of claim 1, wherein the machine-executable instructions, when executed by the one or more processors, cause the one or more processors to, in response to determining that the current version of the security detection module has failed to flag the first condition, output a notification to a computing device.

8. The network security system of claim 1, wherein the machine-executable instructions, when executed by the one or more processors, cause the one or more processors to execute the first test case periodically according to a predetermined schedule.

9. The network security system of claim 1, wherein the machine-executable instructions, when executed by the one or more processors, cause the one or more processors to receive a request initiated by a computing device to execute the first test case, and execute the first test case in response to receiving the request.

10. The network security system of claim 1, wherein the machine-executable instructions, when executed by the one or more processors, cause the one or more processors to receive an input associated with a third security detection module, an update to the current version of the security detection module, a request initiated by a computing device, or any combination thereof, and generate the first test case in response to receiving the input.

11. A method for testing network security in a data network, the method comprising:
   retrieving, using one or more processors, a first test case profile associated with a first test case from one or more databases;
   executing, using the one or more processors, the first test case based on the first test case profile;
   determining, using the one or more processors, that a first security detection module on a first level of a security detection module hierarchy, has failed to flag a first condition associated with the first test case;
   in response to determining that the first security detection module has failed to flag the first condition:
      retrieving, using the one or more processors, a second test case profile associated with a second test case from the one or more databases;
      executing, using the one or more processors, the second test case based on the second test case profile; and
      determining, using the one or more processors, a cause of the first security detection module failing to flag the first condition based on:
         determining, using the one or more processors, that a second security detection module on a second level of the security detection module hierarchy has failed to flag a second condition associated with the second test case, and wherein the first level of the security detection module hierarchy depends on the second level; and
      in response to determining the cause of the first security detection module failing to flag the first condition, implementing, using the one or more processors, a response to correct a cause of the second security detection module failing to flag the second condition.

12. The method of claim 11, wherein implementing the response comprises:
   retrieving, using the one or more processors, a security detection module profile associated with the second security detection module from the one or more databases, wherein the security detection module profile comprises an identifier, a history of revisions, an additional security detection module, a description, or any combination thereof, associated with the second security detection module; and
   modifying, using the one or more processors, the second security detection module using the security detection module profile.

13. The method of claim 12, wherein the second security detection module comprises the history of revisions and modifying the second security detection module comprises reverting one or more changes made to a current version of the second security detection module based on the history of revisions.

14. The method of claim 11, wherein implementing the response comprises:
   retrieving, using the one or more processors, a third test case profile associated with a third test case from the one or more databases;
   executing, using the one or more processors, the third test case based on the third test case profile;
   determining, using the one or more processors, the cause of the second security detection module failing to flag the second condition based on:
      determining, using the one or more processors, that a third security detection module on a third level of the security detection module hierarchy has flagged a third condition associated with the third test case, and wherein the second level of the security detection module hierarchy depends on the third level; and
      in response to determining that the third security detection module flagged the third condition, modifying, using the one or more processors, the second security detection module.

15. The method of claim 11, wherein implementing the response comprises replacing, using the one or more processors, a current version of the second security detection module with a previous version of the second security detection module.

16. The method of claim 11, wherein the cause of the second security detection module failing to flag the first condition comprises a malfunction of hardware operation in the data network, and wherein implementing the response comprises resetting, using the one or more processors, hardware associated with the hardware operation.

17. A tangible, non-transitory, computer-readable medium, comprising computer-readable instructions that, when executed by one or more processors, cause the one or more processors to:
   generate a test case based on a security detection module profile associated with a first security detection module, wherein the first security detection module is configured to flag a condition associated with the test case;
   execute the test case;
   determine that the first security detection module has failed to flag the condition associated with the test case;
   in response to determining that the first security detection module has failed to flag the condition:
      identify information indicative of one or more updates associated with the first security detection module;
      generate a response based on the information indicative of one or more updates associated with the first security detection module, wherein the response is configured to correct the first security detection module for failing to flag the condition associated with the test case; and
      modify a second security detection module that depends on the first security detection module based on the response.

18. The computer-readable medium of claim 17, wherein the information indicative of one or more updates indicates a new security detection profile that depends on the first security detection module, an update to a version of the first security detection module, a new test case, an update to the test case, or any combination thereof.

19. The computer-readable medium of claim 17, wherein the response comprises determining a cause of the first security detection module failing to flag the condition based on executing one or more additional test cases.

20. The computer-readable medium of claim 17, wherein the instructions, when executed by the one or more processors, cause the one or more processors to modify the second security detection module comprises modifying a current version of the second security detection module.

\* \* \* \* \*